United States Patent
Jo et al.

(10) Patent No.: US 10,696,901 B2
(45) Date of Patent: Jun. 30, 2020

(54) METHOD OF MANUFACTURING LIQUID CRYSTAL ALIGNMENT LAYER, LIQUID CRYSTAL ALIGNMENT LAYER MANUFACTURED BY USING THE SAME, AND LIQUID CRYSTAL DISPLAY DEVICE

(71) Applicant: LG CHEM, LTD., Seoul (KR)

(72) Inventors: Jung Ho Jo, Daejeon (KR); Hang Ah Park, Daejeon (KR); Soon Ho Kwon, Daejeon (KR); Hee Han, Daejeon (KR); Jun Young Yoon, Daejeon (KR); Hyeong Seuk Yun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 181 days.

(21) Appl. No.: 15/751,737

(22) PCT Filed: Nov. 2, 2016

(86) PCT No.: PCT/KR2016/012531
§ 371 (c)(1),
(2) Date: Feb. 9, 2018

(87) PCT Pub. No.: WO2017/082579
PCT Pub. Date: May 18, 2017

(65) Prior Publication Data
US 2018/0230384 A1 Aug. 16, 2018

(30) Foreign Application Priority Data
Nov. 11, 2015 (KR) .................. 10-2015-0158388
Oct. 31, 2016 (KR) .................. 10-2016-0142888

(51) Int. Cl.
| | | |
|---|---|---|
| G02F 1/1337 | (2006.01) | |
| C09K 19/54 | (2006.01) | |
| C08G 73/10 | (2006.01) | |
| C09D 179/08 | (2006.01) | |
| C08L 79/08 | (2006.01) | |

(52) U.S. Cl.
CPC ........ C09K 19/542 (2013.01); C08G 73/1042 (2013.01); C08G 73/1078 (2013.01); C09D 179/08 (2013.01); G02F 1/133723 (2013.01); G02F 1/133788 (2013.01); C08L 79/08 (2013.01); C08L 2203/16 (2013.01); C08L 2203/20 (2013.01); C09K 2019/548 (2013.01); G02F 1/1337 (2013.01)

(58) Field of Classification Search
CPC ......... G02F 1/133788; G02F 1/133723; C08G 73/1042
USPC .................. 430/320, 321; 349/124
See application file for complete search history.

(56) References Cited

U.S. PATENT DOCUMENTS

| | | | |
|---|---|---|---|
| 5,612,450 A * | 3/1997 | Mizushima | ....... G02F 1/133723 528/353 |
| 6,831,148 B2 | 12/2004 | Buchecker et al. | |
| 7,914,863 B2 | 3/2011 | Lai et al. | |
| 9,766,501 B2 | 9/2017 | Park et al. | |
| 9,846,332 B2 | 12/2017 | Park et al. | |
| 2007/0128378 A1* | 6/2007 | Kim | ........ C08G 73/14 428/1.2 |
| 2008/0231786 A1 | 9/2008 | Shin | |
| 2010/0060834 A1* | 3/2010 | Fang | .............. C08G 73/1042 349/123 |
| 2010/0151155 A1 | 6/2010 | Kwak et al. | |
| 2010/0243955 A1* | 9/2010 | Tsai | ............ C08G 73/1042 252/299.4 |
| 2011/0080547 A1 | 4/2011 | Matsumori et al. | |
| 2011/0115999 A1 | 5/2011 | Uchino et al. | |
| 2014/0072730 A1 | 3/2014 | Hwang et al. | |
| 2017/0058200 A1* | 3/2017 | Eckert | ............... C08G 73/1025 |

FOREIGN PATENT DOCUMENTS

| | | |
|---|---|---|
| CN | 103687911 A | 3/2014 |
| CN | 104046369 A | 9/2014 |
| JP | 09-185064 A | 7/1997 |
| JP | 2000-221510 A | 8/2000 |
| JP | 2003-255349 A | 9/2003 |
| JP | 2004-264354 A | 9/2004 |
| JP | 2009-173792 A | 8/2009 |
| JP | 2011-076009 A | 4/2011 |

(Continued)

OTHER PUBLICATIONS

Search Report and Written Opinion issued for International Application No. PCT/KR2016/012531 dated Feb. 1, 2017 (12 pages).

*Primary Examiner* — John A McPherson
(74) *Attorney, Agent, or Firm* — Rothwell, Figg, Ernst & Manbeck, P.C.

(57) ABSTRACT

Provided are a method of manufacturing a liquid crystal alignment layer, a liquid crystal alignment layer manufactured by using the same, and a liquid crystal display device including the liquid crystal alignment layer. More specifically, provided are the method of manufacturing the liquid crystal alignment layer with enhanced alignment property and stability, in which a liquid crystal aligning agent is applied onto a substrate, and after drying, alignment treatment is immediately performed by light irradiation while omitting a high-temperature heat treatment process, and then the alignment-treated coating film is cured by heat treatment, thereby reducing light irradiation energy required in the process and simplifying the process by omitting the high-temperature heat treatment process before light irradiation, the liquid crystal alignment layer, and the liquid crystal display device including the same.

7 Claims, No Drawings

(56) References Cited

FOREIGN PATENT DOCUMENTS

| | | |
|---|---|---|
| JP | 2011-107266 A | 6/2011 |
| JP | 2013-156613 A | 8/2013 |
| JP | 5368123 B2 | 12/2013 |
| JP | 5429236 B2 | 2/2014 |
| JP | 5454754 B2 | 3/2014 |
| JP | 2014-167643 A | 9/2014 |
| JP | 2015-135393 A | 7/2015 |
| KR | 10-2004-0046229 A | 6/2004 |
| KR | 10-2006-0045968 A | 5/2006 |
| KR | 10-0663661 B1 | 12/2006 |
| KR | 10-0842156 B1 | 6/2008 |
| KR | 10-0882706 B1 | 2/2009 |
| KR | 10-0939628 B1 | 1/2010 |
| KR | 10-0943147 B1 | 2/2010 |
| KR | 10-0952965 B1 | 4/2010 |
| KR | 10-2011-0074659 A | 7/2011 |
| KR | 10-2013-0038243 A | 4/2013 |
| KR | 10-1277724 B1 | 6/2013 |
| KR | 10-2014-0032883 A | 3/2014 |
| KR | 10-2014-0141620 A | 12/2014 |
| KR | 10-2014-0146523 A | 12/2014 |
| KR | 10-2015-0001826 A | 1/2015 |
| KR | 10-2015-0037576 A | 4/2015 |
| WO | WO 2004/072720 A1 * | 8/2004 |
| WO | 2013-147083 A1 | 10/2013 |

* cited by examiner

METHOD OF MANUFACTURING LIQUID CRYSTAL ALIGNMENT LAYER, LIQUID CRYSTAL ALIGNMENT LAYER MANUFACTURED BY USING THE SAME, AND LIQUID CRYSTAL DISPLAY DEVICE

CROSS-REFERENCE TO RELATED APPLICATION

This application is a 35 U.S.C. 371 National Phase Entry Application from PCT/KR2016/012531, filed Nov. 2, 2016, which claims the benefit of Korean Patent Application No. 10-2015-0158388 filed on Nov. 11, 2015 and Korean Patent Application No. 10-2016-0142888 filed on Oct. 31, 2016 with the Korean Intellectual Property Office, the disclosures of which are herein incorporated by reference in their entirety.

BACKGROUND OF THE INVENTION

(a) Field of the Invention

The present invention relates to a method of manufacturing a liquid crystal alignment layer with enhanced alignment property and stability, a liquid crystal alignment layer manufactured by using the same, and a liquid crystal display device.

(b) Description of the Related Art

In a liquid crystal display device, a liquid crystal alignment layer functions to align liquid crystals in a predetermined direction. Specifically, the liquid crystal alignment layer acts as a director in the alignment of liquid crystal molecules to allow liquid crystals to align in an appropriate direct while moving liquid crystals by an electric field to produce images. Generally, in the liquid crystal display device, uniform alignment of liquid crystals is essential to obtain uniform brightness and a high contrast ratio.

As a common method of aligning liquid crystals, a rubbing method of applying a polymer film such as polyimide onto a substrate such as glass, etc., and rubbing the surface thereof in a predetermined direction with a fiber such as nylon or polyester has been used. However, this rubbing method may generate fine dust or electrostatic discharge (ESD) due to friction between the fiber and the polymer film, resulting in a serious problem during production of liquid crystal panels.

In order to solve the problem of the rubbing method, recent studies have been conducted on a photo-alignment method, in which anisotropy is induced in the polymer film through not friction but light irradiation to align liquid crystals.

A variety of materials have been suggested as materials that may be used in the photo-alignment method. Among them, polyimide is mainly used for good performances of the liquid crystal alignment layer. However, polyimide is generally poor in solvent solubility, and therefore, it is difficult to directly apply polyimide in a process of forming an alignment layer by coating with a solution state of polyimide. For this reason, a precursor form such as polyamic acid or polyamic acid ester with excellent solubility is coated and subjected to a high heat treatment process to form polyimide, which is then subjected to light irradiation for alignment. However, a lot of energy is required to obtain sufficient liquid crystal alignment by light irradiation of the polyimide film. Accordingly, there are limitations that it is difficult to secure productivity in practice and an additional heat treatment process is needed to obtain alignment stability after light irradiation.

SUMMARY OF THE INVENTION

The present invention provides a method of manufacturing a liquid crystal alignment layer with enhanced alignment property and stability.

Further, the present invention provides a liquid crystal alignment layer which is manufactured according to the method of manufacturing the liquid crystal alignment layer, and a liquid crystal display device including the liquid crystal alignment layer.

The present invention provides a method of manufacturing a liquid crystal alignment layer, the method including the steps of:

forming a coating film by applying a liquid crystal aligning agent onto a substrate, the liquid crystal aligning agent including a polymer for liquid crystal alignment including two or more repeating units selected from the group consisting of a repeating unit represented by the following Chemical Formula 1, a repeating unit represented by the following Chemical Formula 2, and a repeating unit represented by the following Chemical Formula 3, wherein the repeating unit represented by the following Chemical Formula 1 is included in an amount of 5 mol % to 74 mol % with respect to a total of the repeating units represented by the following Chemical Formulae 1 to 3;

drying the coating film;

performing alignment treatment of the coating film by light irradiation immediately after the drying step; and curing the alignment-treated coating film by heat treatment:

[Chemical Formula 1]

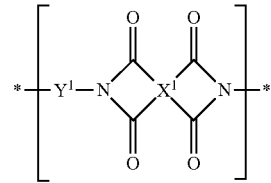

[Chemical Formula 2]

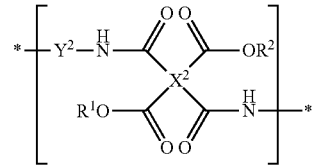

[Chemical Formula 3]

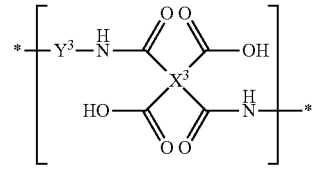

wherein $R^1$ and $R^2$ are each independently hydrogen or an alkyl group having 1 to 10 carbon atoms, provided that $R^1$ and $R^2$ are not all hydrogen, $X^1$ is a tetravalent organic group represented by the following Chemical Formula 4,

[Chemical Formula 4]

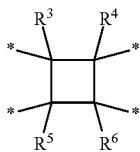

R³ to R⁶ are each independently hydrogen or an alkyl group having 1 to 6 carbon atoms, X² and X³ are each independently a tetravalent organic group derived from hydrocarbon having 4 to 20 carbon atoms, or a tetravalent organic group, in which one or more hydrogens are substituted with halogen, or one or more —CH₂— groups are substituted with —O—, —CO—, —S—, —SO—, —SO₂— or —CONH— to prevent direct linkage of oxygen or sulfur atoms, Y¹ to Y³ are each independently a divalent organic group represented by the following Chemical Formula 5,

[Chemical Formula 5]

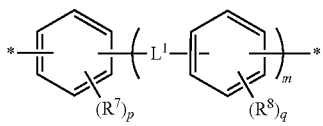

wherein R⁷ and R⁸ are each independently halogen, a cyano group, an alkyl group having 1 to 10 carbon atoms, an alkenyl group having 2 to 10 carbon atoms, an alkoxy group having 1 to 10 carbon atoms, a fluoroalkyl group having 1 to 10 carbon atoms, or a fluoroalkoxy group having 1 to 10 carbon atoms, p and q are each independently an integer of 0 to 4, L¹ is a single bond, —O—, —CO—, —S—, —SO₂—, —C(CH₃)₂—, —C(CF₃)₂—, —CONH—, —COO—, —(CH₂)$_z$—, —O(CH₂)$_z$O—, —O(CH₂)$_z$—, —OCH₂—C(CH₃)₂—CH₂O—, —COO—(CH₂)$_z$—OCO— or —OCO—(CH₂)$_z$—COO—, z is an integer of 1 to 10, and m is an integer of 0 to 3.

Further, the present invention provides a method of manufacturing a liquid crystal alignment layer, the method including the steps of:

forming a coating film by applying a liquid crystal aligning agent onto a substrate, the liquid crystal aligning agent including a polymer for liquid crystal alignment including two or more repeating units selected from the group consisting of a repeating unit represented by the following Chemical Formula 1, a repeating unit represented by the following Chemical Formula 2, and a repeating unit represented by the following Chemical Formula 3, wherein the repeating unit represented by the following Chemical Formula 1 is included in an amount of 5 mol % to 74 mol % with respect to a total of the repeating units represented by the following Chemical Formulae 1 to 3;

drying the coating film;

performing alignment treatment of the coating film by light irradiation immediately after the drying step; and curing the alignment-treated coating film by heat treatment:

[Chemical Formula 1]

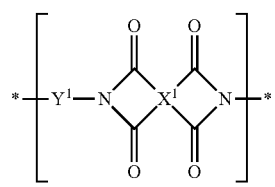

[Chemical Formula 2]

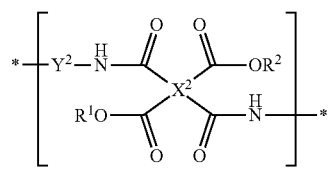

[Chemical Formula 3]

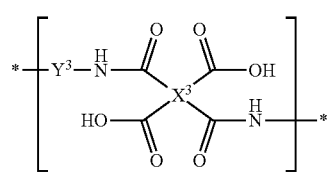

wherein R¹ and R² are each independently hydrogen or an alkyl group having 1 to 10 carbon atoms, provided that R¹ and R² are not all hydrogen, X¹ is a tetravalent organic group, X² and X³ are each independently a tetravalent organic group derived from hydrocarbon having 4 to 20 carbon atoms, or a tetravalent organic group, in which one or more hydrogens are substituted with halogen, or one or more —CH₂— groups are substituted with —O—, —CO—, —S—, —SO—, —SO₂— or —CONH— to prevent direct linkage of oxygen or sulfur atoms, Y¹ to Y³ are each independently a divalent organic group represented by the following Chemical Formula 5,

[Chemical Formula 5]

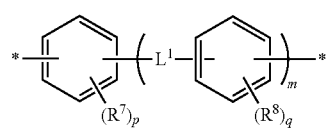

wherein R⁷ and R⁸ are each independently halogen, a cyano group, an alkyl group having 1 to 10 carbon atoms, an alkenyl group having 2 to 10 carbon atoms, an alkoxy group having 1 to 10 carbon atoms, a fluoroalkyl group having 1 to 10 carbon atoms, or a fluoroalkoxy group having 1 to 10 carbon atoms, p and q are each independently an integer of 0 to 4, L¹ is a single bond, —O—, —CO—, —S—, —SO₂—, —C(CH₃)₂—, —C(CF₃)₂—, —CONH—, —COO—, —(CH₂)$_z$—, —O(CH₂)$_z$O—, —O(CH₂)$_z$—, —OCH₂—C(CH₃)₂—CH₂O—, —COO—(CH₂)$_z$—OCO— or —OCO—(CH₂)$_z$—COO—, z is an integer of 1 to 10, and m is an integer of 0 to 3.

Further, the present invention provides a liquid crystal alignment layer which is manufactured according to the method of manufacturing the liquid crystal alignment layer.

Further, the present invention provides a liquid crystal display device including the liquid crystal alignment layer.

Hereinafter, a method of manufacturing a liquid crystal alignment layer, a liquid crystal alignment layer, and a liquid crystal display device according to specific embodiments of the present invention will be described in more detail.

According to an embodiment of the present invention, provided is a method of manufacturing a liquid crystal alignment layer, the method including the steps of:

forming a coating film by applying a liquid crystal aligning agent onto a substrate, the liquid crystal aligning agent including a polymer for liquid crystal alignment including two or more repeating units selected from the group consisting of a repeating unit represented by the following Chemical Formula 1, a repeating unit represented by the following Chemical Formula 2, and a repeating unit represented by the following Chemical Formula 3, wherein the repeating unit represented by the following Chemical Formula 1 is included in an amount of 5 mol % to 74 mol % with respect to a total of the repeating units represented by the following Chemical Formulae 1 to 3;

drying the coating film;

performing alignment treatment of the coating film by light irradiation immediately after the drying step; and curing the alignment-treated coating film by heat treatment.

When polyimide was generally used as the liquid crystal alignment layer, a polyimide precursor with excellent solubility, polyamic acid or polyamic acid ester, was applied and dried to form the coating film, and then the coating film was converted to a polyimide film by high-temperature heat treatment, and the polyimide film was subjected to alignment treatment by light irradiation. However, in order to obtain sufficient alignment by light irradiation of the polyimide film, a lot of light irradiation energy is needed. An additional heat treatment process is also needed in order to secure alignment stability after light irradiation. The use of a lot of light irradiation energy and the additional high-temperature heat treatment process are very disadvantageous in terms of process cost and time, and thus there are restrictions in application of the method to a practical mass-production process.

Accordingly, the present inventors found that when a polymer including two or more repeating units selected from the group consisting of the repeating unit represented by the following Chemical Formula 1, the repeating unit represented by the following Chemical Formula 2, and the repeating unit represented by the following Chemical Formula 3, wherein among the repeating units, the imide repeating unit represented by the following Chemical Formula 1 is included in an amount of 5 mol % to 74 mol %, is used, the polymer includes a predetermined amount of the imide repeating unit which has been imidized, and thus light irradiation is immediately performed to produce anisotropy without a high-temperature heat treatment process after forming the coating film, and thereafter, heat treatment is performed to completely produce the alignment layer. Accordingly, the present inventors confirmed that light irradiation energy may be greatly reduced, and a liquid crystal alignment layer with enhanced alignment property and stability may be manufactured by a simple process including a single heat treatment process, thereby completing the present invention.

Unless otherwise specified herein, the following terms may be defined as follows.

The hydrocarbon having 4 to 20 carbon atoms may be alkane having 4 to 20 carbon atoms, alkene having 4 to 20 carbon atoms, alkyne having 4 to 20 carbon atoms, cycloalkane having 4 to 20 carbon atoms, cycloalkene having 4 to 20 carbon atoms, arene having 6 to 20 carbon atoms, or a fused ring in which one or more of the cyclic hydrocarbons share two or more atoms, or a hydrocarbon in which one or more of the hydrocarbons are chemically linked to each other. Specifically, the hydrocarbon having 4 to 20 carbon atoms may be exemplified by n-butane, cyclobutane, 1-methylcyclobutane, 1,3-dimethylcyclobutane, 1,2,3,4-tetramethylcyclobutane, cyclopentane, cyclohexane, cycloheptane, cyclooctane, cyclohexene, 1-methyl-3-ethylcyclohexene, bicyclohexyl, benzene, biphenyl, diphenylmethane, 2,2-diphenylpropane, 1-ethyl-1,2,3,4-tetrahydronaphthalene, 1,6-diphenylhexane, etc.

The alkyl group having 1 to 10 carbon atoms may be a linear, branched, or cyclic alkyl group. Specifically, the alkyl group having 1 to 10 carbon atoms may be a linear alkyl group having 1 to 10 carbon atoms; a linear alkyl group having 1 to 5 carbon atoms; a branched or cyclic alkyl group having 3 to 10 carbon atoms; or a branched or cyclic alkyl group having 3 to 6 carbon atoms. More specifically, the alkyl group having 1 to 10 carbon atoms may be exemplified by a methyl group, an ethyl group, a n-propyl group, an iso-propyl group, a n-butyl group, an iso-butyl group, a tert-butyl group, a n-pentyl group, an iso-pentyl group, a neo-pentyl group, a cyclohexyl group, etc.

The alkoxy group having 1 to 10 carbon atoms may be a linear, branched, or cyclic alkoxy group. Specifically, the alkoxy group having 1 to 10 carbon atoms may be a linear alkoxy group having 1 to 10 carbon atoms; a linear alkoxy group having 1 to 5 carbon atoms; a branched or cyclic alkoxy group having 3 to 10 carbon atoms; or a branched or cyclic alkoxy group having 3 to 6 carbon atoms. More specifically, the alkoxy group having 1 to 10 carbon atoms may be exemplified by a methoxy group, an ethoxy group, a n-propoxy group, an iso-propoxy group, a n-butoxy group, an iso-butoxy group, a tert-butoxy group, a n-pentoxy group, an iso-pentoxy group, a neo-pentoxy group, a cycloheptoxy group, etc.

The fluoroalkyl group having 1 to 10 carbon atoms may be an alkyl group having 1 to 10 carbon atoms, in which one or more hydrogens are substituted with fluorine, and the fluoroalkoxy group having 1 to 10 carbon atoms may be an alkoxy group having 1 to 10 carbon atoms, in which one or more hydrogens are substituted with fluorine.

The alkenyl group having 2 to 10 carbon atoms may be a linear, branched, or cyclic alkenyl group. Specifically, the alkenyl group having 2 to 10 carbon atoms may be a linear alkenyl group having 2 to 10 carbon atoms, a linear alkenyl group having 2 to 5 carbon atoms, a branched alkenyl group having 3 to 10 carbon atoms, a branched alkenyl group having 3 to 6 carbon atoms, a cyclic alkenyl group having 5 to 10 carbon atoms, or a cyclic alkenyl group having 6 to 8 carbon atoms. More specifically, the alkenyl group having 2 to 10 carbon atoms may be exemplified by an ethenyl group, a propenyl group, a butenyl group, a pentenyl group, a cyclohexenyl group, etc.

The halogen may be fluorine (F), chlorine (Cl), bromine (Br), or iodine (I).

A multivalent organic group derived from an arbitrary compound refers to a moiety, in which a plurality of hydrogen atoms binding to the arbitrary compound is removed. For example, a tetravalent organic group derived from cyclobutane refers to a moiety, in which any 4 hydrogen atoms binding to cyclobutane are removed.

In the present invention, ——* in Chemical Formula refers to a moiety, in which hydrogen in the corresponding position is removed. For example,

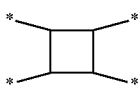 [SMILES: *C1C(*)C(*)C1*]

refers to a moiety, in which 4 hydrogen atoms binding to carbons at positions 1, 2, 3, and 4 of cyclobutane are removed, that is, refers to any one of tetravalent organic groups derived from cyclobutane.

Specifically, the polymer for liquid crystal alignment of the liquid crystal alignment layer according to an embodiment includes two or more repeating units selected from the group consisting of the repeating unit represented by Chemical Formula 1, the repeating unit represented by Chemical Formula 2, and the repeating unit represented by Chemical Formula 3. In the repeating units of Chemical Formulae 1 to 3, $X^1$ is a tetravalent organic group, and more preferably, a tetravalent organic group represented by Chemical Formula 4, $X^2$ and $X^3$ are each independently a tetravalent organic group derived from hydrocarbon having 4 to 20 carbon atoms, or a tetravalent organic group, in which one or more hydrogens are substituted with halogen, or one or more —$CH_2$— groups are substituted with —O—, —CO—, —S—, —SO—, —$SO_2$— or —CONH— to prevent direct linkage of oxygen or sulfur atoms.

For example, $X^2$ and $X^3$ may be each independently a tetravalent organic group described in the following Chemical Formula 6:

[Chemical Formula 6]

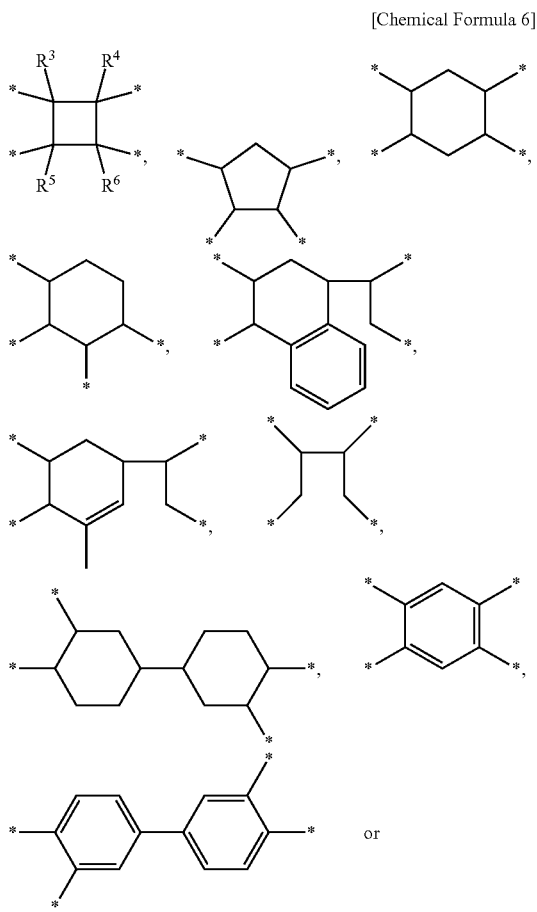

or

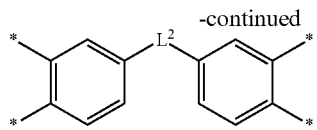

-continued wherein $R^3$ to $R^6$ are each independently hydrogen or an alkyl group having 1 to 6 carbon atoms, $L^2$ is any one selected from the group consisting of a single bond, —O—, —CO—, —S—, —SO—, —$SO_2$—, —$CR^9R^{10}$—, —CONH—, phenylene, or combinations thereof, $R^9$ and $R^{10}$ are each independently hydrogen or an alkyl or fluoroalkyl group having 1 to 10 carbon atoms.

Meanwhile, $Y^1$ to $Y^3$ are defined by a divalent organic group represented by Chemical Formula 5 to provide a polymer for liquid crystal alignment having various structures capable of exhibiting the above-described effect.

In Chemical Formula 5, hydrogens bind to carbon atoms which are not substituted with $R^7$ or $R^8$, and when p or q is an integer of 2 to 4, a plurality of $R^7$ or $R^8$ may be substituents which are the same as or different from each other. In Chemical Formula 5, m may be an integer of 0 to 3 or an integer of 0 or 1.

The polymer for liquid crystal alignment used in the method of manufacturing the liquid crystal alignment layer of an embodiment may include 5 mol % to 74 mol %, preferably 10 mol % to 60 mol % of the repeating unit represented by Chemical Formula 1 which is an imide repeating unit, with respect to a total of the repeating units represented by Chemical Formula 1, Chemical Formula 2, and Chemical Formula 3.

As described above, when the polymer having a particular content of the imide repeating unit represented by Chemical Formula 1 is used, the polymer includes a particular content of the imide repeating unit which has been previously imidized. Therefore, although a high-temperature heat treatment process is omitted and light irradiation is immediately performed, it is possible to manufacture a liquid crystal alignment layer with excellent alignment property and stability.

If the repeating unit represented by Chemical Formula 1 is included in an amount below the range, sufficient alignment property may not be obtained, and alignment stability may be deteriorated. If the repeating unit represented by Chemical Formula 1 is included in an amount above the range, there is a problem that solubility may be lowered, and thus it is difficult to prepare a stable alignment solution to be applicable. Accordingly, it is preferable that the repeating unit represented by Chemical Formula 1 is included in an amount within the above range, in terms of providing a polymer for liquid crystal alignment which is excellent in storage stability, electrical property, alignment property, and alignment stability.

Further, the repeating unit represented by Chemical Formula 2 or the repeating unit represented by Chemical Formula 3 may be included in an appropriate amount depending on desired properties.

Specifically, the repeating unit represented by Chemical Formula 2 may be included in an amount of 0 mol % to 40 mol %, preferably 0 mol % to 30 mol % with respect to a total of the repeating units represented by Chemical Formulae 1 to 3. A conversion rate of the repeating unit represented by Chemical Formula 2 to imide is low during the high-temperature heat treatment process after light irradiation, and therefore, if its content exceeds the above range, the overall imidization rate is insufficient and the alignment stability may be lowered. Accordingly, when the repeating unit represented by Chemical Formula 2 is used within the above range, it exhibits proper solubility, thereby providing a polymer for liquid crystal alignment with excellent process property and a high imidization rate.

Further, the repeating unit represented by Chemical Formula 3 may be included in an amount of 0 mol % to 95 mol %, preferably 10 mol % to 90 mol % with respect to a total of the repeating units represented by Chemical Formulae 1 to 3. When the repeating unit represented by Chemical Formula 3 is used within the above range, it shows excellent coating property, thereby providing a polymer for liquid crystal alignment with excellent process property and a high imidization rate.

According to the method of manufacturing the liquid crystal alignment layer of an embodiment, a liquid crystal aligning agent including the polymer for liquid crystal alignment is applied onto a substrate to form a coating film. A method of applying the liquid crystal aligning agent onto the substrate is not particularly limited, and for example, screen printing, off-set printing, flexo printing, ink-jet printing, etc. may be used.

The liquid crystal aligning agent may be prepared by dissolving or dispersing the polymer for liquid crystal alignment in an organic solvent.

Specific examples of the organic solvent may include N,N-dimethylformaldehyde, N,N-dimethylacetamide, N-methyl-2-pyrrolidone, N-methylcaprolactam, 2-pyrrolidone, N-ethylpyrrolidone, N-vinylpyrrolidone, dimethylsulfoxide, tetramethylurea, pyridine, dimethylsulfone, hexamethylsulfoxide, γ-butyrolactone, 3-methoxy-N,N-dimethylpropaneamide, 3-ethoxy-N,N-dimethylpropaneamide, 3-butoxy-N,N-dimethylpropaneamide, 1,3-dimethyl-imidazolidinone, ethylamylketone, methylnonylketone, methylethylketone, methylisoamylketone, methylisopropylketone, cyclohexanone, ethylene carbonate, propylene carbonate, diglyme, 4-hydroxy-4-methyl-2-pentanone, ethylene glycol monomethyl ether, ethylene glycol monomethyl ether acetate, ethylene glycol monoethyl ether, ethylene glycol monoethyl ether acetate, ethylene glycol monopropyl ether, ethylene glycol monopropyl ether acetate, ethylene glycol monoisopropyl ether, ethylene glycol monoisopropyl ether acetate, ethylene glycol monobutyl ether, ethylene glycol monobutyl ether acetate, etc. These solvents may be used alone or in combination.

The photo-aligning agent may further include other components in addition to the polymer and the organic solvent. For non-limiting example, when the photo-aligning agent is applied, an additive capable of increasing uniformity of film thickness or surface smoothness, an additive capable of improving adhesion between the photo-alignment film and the substrate, an additive capable of changing the dielectric constant or conductivity of the photo-alignment film, or an additive capable of increasing compactness of the photo-alignment film may be further included. The additive may be exemplified by a variety of solvents, surfactants, silane-based compounds, dielectric substances, crosslinkable compounds, etc.

Next, the coating film which is formed by applying the liquid crystal aligning agent onto the substrate may be dried. The step of drying the coating film may be performed by using a method of heating or vacuum evaporating the coating film, etc., and the drying may be preferably performed at 50° C. to 150° C., or 60° C. to 140° C.

Next, according to the method of manufacturing the liquid crystal alignment layer of an embodiment, the coating film immediately after the drying step may be subjected to alignment treatment by light irradiation. As used herein, the "coating film immediately after the drying step" means that light radiation is performed immediately after the drying step without performing a heat treatment process at a temperature higher than that of the drying step, and a process other than the heat treatment may be also performed.

More specifically, when a liquid crystal alignment layer is manufactured by using a known liquid crystal aligning agent including polyamic acid or polyamic acid ester, it is necessary to perform high-temperature heat treatment for imidization of polyamic acid before light irradiation. However, when a liquid crystal alignment layer is manufactured by using the above-described liquid crystal aligning agent according to an embodiment, alignment treatment is immediately performed by light irradiation without the heat treatment step, and then the alignment-treated coating film is cured by heat treatment, thereby manufacturing the liquid crystal alignment layer with sufficient alignment property and enhanced stability under low light irradiation energy.

The light irradiation in the alignment treatment step may be performed by irradiating polarized ultraviolet rays having a wavelength of 150 nm to 450 nm. In this regard, a dose of the light exposure may differ depending on the type of the polymer, and energy of 10 mJ/cm$^2$ to 10 J/cm$^2$, preferably energy of 30 mJ/cm$^2$ to 2 J/cm$^2$ may be irradiated.

The alignment treatment is performed by any UV radiation selected from UV radiations polarized by passing through or being reflected from (1) a polarizer using a dielectric anisotropic coating on the surface of a transparent substrate such as quartz glass, soda-lime glass, soda-lime-free glass, etc.; (2) a polarizer with fine aluminum or other metallic wires; or (3) a Brewster polarizer using reflection from quartz glass. At this time, the polarized ultraviolet rays may be irradiated in a direction perpendicular with respect to the substrate, or may be obliquely irradiated at a particular angle of incidence. By this method, alignment ability of the liquid crystal molecules is provided for the coating film.

Next, the step of curing the alignment-treated coating film by heat treatment is included. The step of curing the alignment-treated coating film by heat treatment is performed after light irradiation as in a known method of manufacturing a liquid crystal alignment layer by using a polymer for liquid crystal alignment including polyamic acid or polyamic acid ester, and the step is distinguished from the heat treatment step which is performed for imidization of the liquid crystal aligning agent before light radiation or during light radiation after applying the liquid crystal aligning agent onto the substrate.

In this regard, the heat treatment may be performed by a heating means such as a hot plate, a hot air circulating oven, an infrared oven, etc., and preferably performed at 150° C. to 300° C., or 200° C. to 250° C.

According to another embodiment of the present invention, provided is a liquid crystal alignment layer which is manufactured according to the method of manufacturing the liquid crystal alignment layer of an embodiment.

As described above, when the polymer including two or more repeating units selected from the group consisting of the repeating unit represented by Chemical Formula 1, the repeating unit represented by Chemical Formula 2, and the repeating unit represented by Chemical Formula 3, wherein the imide repeating unit represented by the following Chemical Formula 1 is included in an amount of 5 mol % to 74 mol %, is used, the liquid crystal alignment layer with enhanced alignment property and stability may be manufactured.

According to still another embodiment of the present invention, provided is a liquid crystal display device including the above-described liquid crystal alignment layer.

The liquid crystal alignment layer may be introduced into a liquid crystal cell by a known method, and the liquid crystal cell may be also introduced into a liquid crystal display device by a known method. Since the liquid crystal alignment layer may be manufactured from the polymer including a particular amount of the repeating unit represented by Chemical Formula 1, it may exhibit superior stability together with excellent physical properties. Accordingly, provided is a liquid crystal display device with high reliability.

According to the present invention, provided are a method of manufacturing a liquid crystal alignment layer with enhanced alignment property and stability, in which a liquid crystal aligning agent is applied onto a substrate, and after drying, alignment treatment is immediately performed by light irradiation while omitting the high heat treatment process, and then the alignment-treated coating film is cured by heat treatment, thereby reducing light irradiation energy and simplifying the process, a liquid crystal alignment layer, and a liquid crystal display device including the same.

DETAILED DESCRIPTION OF THE EMBODIMENTS

The present invention will be described in more detail in the following Examples. However, the following Examples are for illustrative purposes only, and the scope of the present invention is not intended to be limited by the following Examples.

Synthesis Example 1: Synthesis of Diamine DA-1

Diamine DA-1 was synthesized according to the following Reaction Scheme 1.

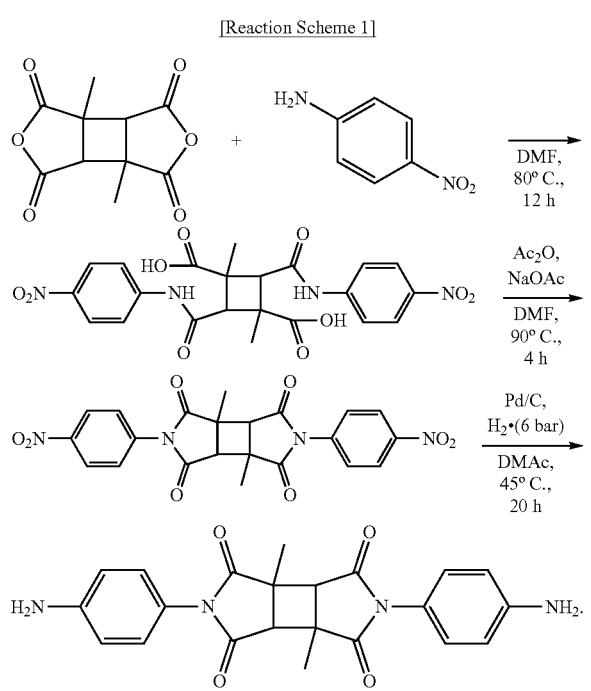

1,3-dimethylcyclobutane-1,2,3,4-tetracarboxylic acid dianhydride (DMCBDA) and 4-nitroaniline were dissolved in dimethylformamide (DMF) to prepare a mixture. Subsequently, this mixture was allowed to react at about 80° C. for about 12 hours to prepare amic acid. Thereafter, the amic acid was dissolved in DMF, and acetic anhydride and sodium acetate were added thereto to prepare a mixture. Subsequently, amic acid in the mixture was imidized at about 90° C. for about 4 hours. Imide thus obtained was dissolved in dimethylacetamide (DMAc), and then Pd/C was added thereto to prepare a mixture. This mixture was reduced at 45° C. under a hydrogen pressure of 6 bar for 20 minutes to prepare diamine DA-1.

Synthesis Example 2: Synthesis of Diamine DA-2

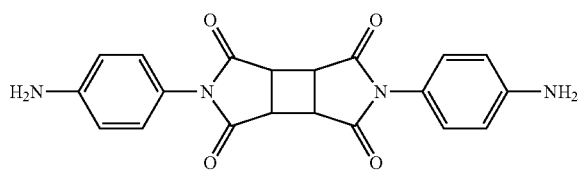 [SMILES: Nc1ccc(N2C(=O)C3C(C2=O)C2C(=O)N(c4ccc(N)cc4)C(=O)C32)cc1]

DA-2 having the above structure was prepared in the same manner as in Synthesis Example 1, except that cyclobutane-1,2,3,4-tetracarboxylic acid dianhydride (CBDA) was used instead of 1,3-dimethylcyclobutane-1,2,3,4-tetracarboxylic acid dianhydride (DMCBDA).

Synthesis Example 3: Synthesis of Diamine DA-3

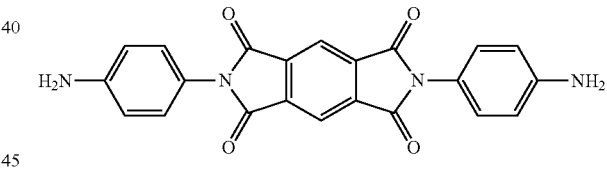

DA-3 having the above structure was prepared in the same manner as in Synthesis Example 1, except that pyromellitic dianhydride (PMDA) was used instead of 1,3-dimethylcyclobutane-1,2,3,4-tetracarboxylic acid dianhydride (DMCBDA).

Synthesis Example 4: Synthesis of Diamine DA-4

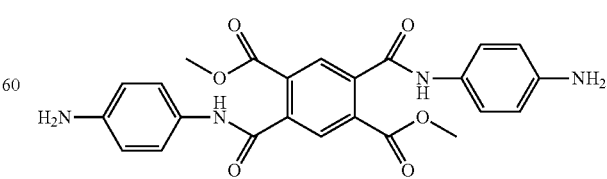

Diamine DA-4 was synthesized according to the following Reaction Scheme 2.

[Reaction Scheme 2]

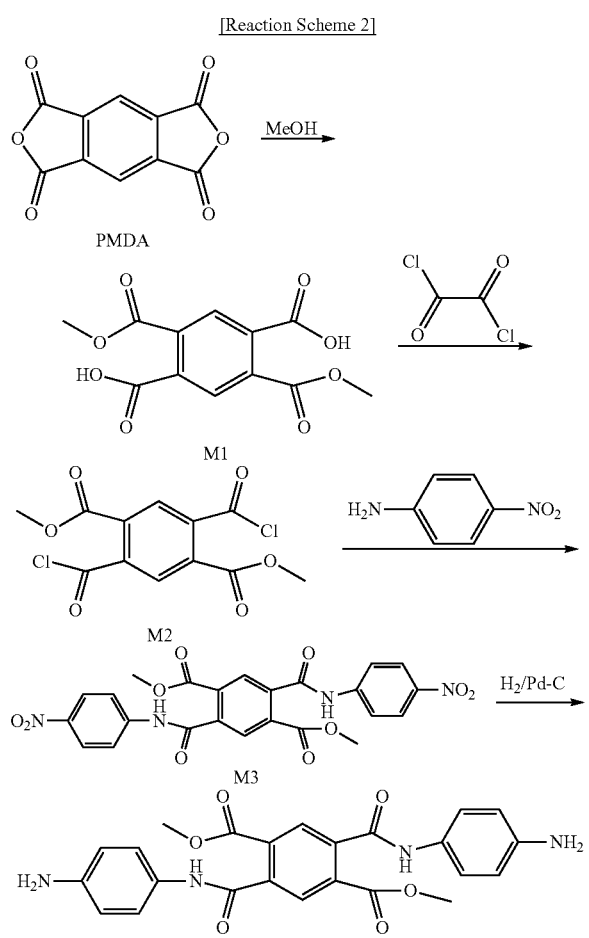

25 g of pyromellitic dianhydride (PMDA) was added to 250 mL of methanol, and 1 to 2 drop(s) of hydrochloric acid was added. Subsequently, a mixture was refluxed under heating at 75° C. for 5 hours. Then, a solvent was removed under reduced pressure, and ethyl acetate and 300 mL of normal hexane were added thereto for solidification. A solid thus produced was filtered under reduced pressure and dried at 40° C. under reduced pressure to obtain 32 g of M1.

100 mL of toluene was added to 34 g of M1 thus obtained, and 35 g of oxalyl chloride was added at room temperature. 2 to 3 drops of dimethylformamide (DMF) were added dropwise, and stirred at 50° C. for 16 hours. A product was cooled to room temperature, and the solvent and the residual oxalyl chloride were removed under reduced pressure. 300 mL of normal hexane was added to a yellow solid product, and refluxed under heating at 80° C. The heated reaction solution was filtered to remove impurities which were not dissolved in normal hexane. A resulting solution was slowly cooled to room temperature, and a resulting white crystal was filtered. The crystal was dried in an oven under reduced pressure at 40° C. to obtain 32.6 g of M2.

29.6 g of 4-nitroaniline and 21.7 g of triethanolamine (TEA) were added to 400 mL of tetrahydrofuran (THF), and 32.6 g of M2 was added thereto at room temperature. A resulting mixture was stirred at room temperature for 16 hours to filter a resulting precipitate. 400 mL of dichloromethane was added to a filtrate, and washed with a 0.1 N hydrochloric acid aqueous solution, and then washed with a saturate sodium hydrogen carbonate (NaHCO$_3$) aqueous solution. An organic solution thus washed was filtered under reduced pressure to obtain a solid product, which was recrystallized with dichloromethane to obtain 43 g of M3 which is a solid-phase dinitro compound.

43 g of the dinitro compound M3 thus obtained was added to a high pressure reactor and dissolved in 500 mL of THF. Subsequently, 2.2 g of 10 wt % Pd—C was added, followed by stirring under hydrogen gas (H$_2$) of 3 atm for 16 hours at room temperature. After reaction, Pd—C was removed using a celite filter, and filtered. A filtrate was concentrated under reduced pressure to obtain 37 g of esterified diamine DA-4.

Synthesis Example 5: Synthesis of Diamine DA-5

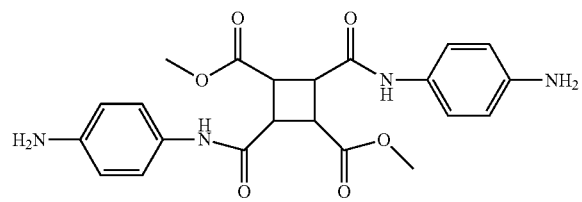 [SMILES: COC(=O)C1C(C(=O)Nc2ccc(N)cc2)C(C(=O)OC)C1C(=O)Nc1ccc(N)cc1]

DA-5 having the above structure was prepared in the same manner as in Synthesis Example 3, except that cyclobutane-1,2,3,4-tetracarboxylic acid dianhydride (CBDA) was used instead of pyromellitic dianhydride (PMDA).

Example 1: Preparation of P-1 Polymer for Liquid Crystal Alignment 5.0 g (13.3 mmol) of DA-2 prepared in Synthesis Example 2 was completely dissolved in 71.27 g of anhydrous N-methyl pyrrolidone (NMP). In an ice bath, 2.92 g (13.03 mmol) of 1,3-dimethyl-cyclobutane-1,2,3,4-tetracarboxylic acid dianhydride (DMCBDA) was added to the solution, and stirred at room temperature for 16 hours. The obtained solution was added to an excess amount of distilled water to produce a precipitate. Subsequently, the produced precipitate was filtered, and washed with distilled water twice and then washed with methanol three times. A solid product thus obtained was dried in an oven at 40° C. under reduced pressure for 24 hours to obtain 6.9 g of P-1 polymer for liquid crystal alignment.

A molecular weight of P-1 was examined by GPC, and as a result, its number average molecular weight (Mn) was 15,500 g/mol and its weight average molecular weight (Mw) was 31,000 g/mol. A monomer structure of the P-1 polymer is determined by an equivalent ratio of the monomers used, and a ratio of the imide structure in the molecule was 50.5% and a ratio of the amic acid structure in the molecule was 49.5%.

Example 2: Preparation of P-2 Polymer for Liquid Crystal Alignment

Polymer P-2 was prepared in the same manner as in Example 1, except that 5.0 g of DA-1 and 1.07 g of phenylenediamine (PDA) were first dissolved in 89.81 g of NMP, and then 1.90 g of cyclobutane-1,2,3,4-tetracarboxylic acid dianhydride (CBDA) and 3.00 g of oxy-diphthalic dianhydride (OPDA) were added thereto in Example 1. A molecular weight of P-2 was examined by GPC, and as a result, its number average molecular weight (Mn) was 17,000 g/mol and its weight average molecular weight (Mw) was 33,000 g/mol. With regard to the polymer P-2, a ratio of the imide structure in the molecule was 33.8% and a ratio of the amic acid structure in the molecule was 66.2%.

Example 3: Preparation of P-3 Polymer for Liquid Crystal Alignment

Polymer P-3 was prepared in the same manner as in Example 1, except that 4.0 g of DA-2 and 2.13 g of oxydianiline (ODA) were first dissolved in 96.85 g of NMP, and then 3.27 g of DMCBDA and 1.36 g of pyromellitic dianhydride (PMDA) were added thereto in Example 1. A molecular weight of P-3 was examined by GPC, and as a result, its number average molecular weight (Mn) was 14,500 g/mol and its weight average molecular weight (Mw) was 29,000 g/mol. With regard to the polymer P-3, a ratio of the imide structure in the molecule was 33.8% and a ratio of the amic acid structure in the molecule was 66.2%.

Example 4: Preparation of P-4 Polymer for Liquid Crystal Alignment

Polymer P-4 was prepared in the same manner as in Example 1, except that 2.0 g of DA-1 and 7.63 g of DA-6 were first dissolved in 156.88 g of NMP, and then 5.80 g of DMCBDA and 2.00 g of oxy-diphthalic dianhydride (OPDA) were added thereto in Example 1. A molecular weight of P-4 was examined by GPC, and as a result, its number average molecular weight (Mn) was 19,500 g/mol and its weight average molecular weight (Mw) was 37,000 g/mol. With regard to the polymer P-4, a ratio of the imide structure in the molecule was 13.3% and a ratio of the amic acid structure in the molecule was 86.7%.

Example 5: Preparation of P-5 Polymer for Liquid Crystal Alignment

Polymer P-5 was prepared in the same manner as in Example 1, except that 5.0 g of DA-1 and 3.93 g of DA-5 were first dissolved in 127.94 g of NMP, and then 5.28 g of cyclobutane-1,2,3,4-tetracarboxylic acid dianhydride (CBDA) was added thereto in Example 1. A molecular weight of P-5 was examined by GPC, and as a result, its number average molecular weight (Mn) was 17,000 g/mol and its weight average molecular weight (Mw) was 35,000 g/mol. With regard to the polymer P-5, a ratio of the imide structure in the molecule was 22.7%, a ratio of the amic acid ester structure in the molecule was 27.8%, and a ratio of the amic acid structure in the molecule was 49.5%.

Example 6: Preparation of P-6 Polymer for Liquid Crystal Alignment

Polymer P-6 was prepared in the same manner as in Example 1, except that 8.0 g of DA-2 and 1.06 g of DA-4 were first dissolved in 131.00 g of NMP, and then 5.49 g of DMCBDA was added thereto in Example 1. A molecular weight of P-6 was examined by GPC, and as a result, its number average molecular weight (Mn) was 15,500 g/mol and its weight average molecular weight (Mw) was 29,000 g/mol. With regard to the polymer P-6, a ratio of the imide structure in the molecule was 42.9%, a ratio of the amic acid ester structure in the molecule was 7.6%, and a ratio of the amic acid structure in the molecule was 49.5%.

Example 7: Preparation of P-7 Polymer for Liquid Crystal Alignment 3.0 g of DA-5 and 4.98 g of p-phenylene diamine (PDA) were completely dissolved in 185.8 g of anhydrous N-methyl pyrrolidone (NMP). In an ice bath, 12.66 g of 1,3-dimethyl-cyclobutane-1,2,3,4-tetracarboxylic acid dianhydride (DMCBDA) was added to the mixture, and stirred at room temperature for 16 hours to synthesize a polymer solution PA-7.

6.9 g of acetic anhydride and 5.4 g of pyridine were added to the PA-7 solution thus obtained, and chemical imidization was allowed under stirring at 50° C. for 6 hours. A product thus obtained was added to an excess amount of distilled water to produce a precipitate. Subsequently, the produced precipitate was filtered, and washed with distilled water twice and then washed with methanol three times. A solid product thus obtained was dried in an oven at 40° C. under reduced pressure for 24 hours to obtain 15.5 g of a polymer for liquid crystal alignment (P-7). A molecular weight of P-7 was examined by GPC, and as a result, its number average molecular weight (Mn) was 14,500 g/mol and its weight average molecular weight (Mw) was 28,000 g/mol.

Meanwhile, a composition of P-7 was quantitatively analyzed as follows.

Before chemical imidization, the obtained PA-7 solution was applied onto a glass substrate, and then imidization was allowed by heat treatment in an oven at 300° C. for 2 hours. An imidization rate of a material obtained through this process was defined as 100%, and C—N peak (1380 cm$^{-1}$) of imide appearing in an IR spectrometer was compared with that of P-7 obtained through the chemical imidization process. In detail, an aromatic peak around 1520 cm$^{-1}$ was determined as a standard for normalization, and intensity (I) of C—N peaks of PA-7 and P-7 around 1380 cm$^{-1}$ were integrated and put in the following Equation 1, thereby quantify an imidization rate.

$$\text{Imidization rate (\%)}=[(I_{1380,P\text{-}7}-I_{1520,P\text{-}7})/(I_{1380,PA\text{-}7@300}-I_{1520,PA\text{-}7@300})]*100 \qquad [\text{Equation 1}]$$

wherein $I_{1380,P\text{-}7}$ is intensity of C—N peak of P-7 which appears around 1380 cm$^{-1}$, $I_{1520,P\text{-}7}$ is intensity of aromatic peak of P-7 which appears around 1520 cm$^{-1}$, $I_{1380,PA\text{-}7@300}$ is intensity of C—N peak of a material obtained by heat treatment of PA-7 at 300° C. which appears around 1380 cm$^{-1}$, and $I_{1520,PA\text{-}7@300}$ is intensity of aromatic peak of a material obtained by heat treatment of PA-7 at 300° C. which appears around 1520 cm$^{-1}$.

An amic acid ester ratio was confirmed by comparing the methoxy peaks of amic acid ester appearing at 3.5 ppm to 3.9 ppm with the aromatic hydrogen peaks appearing at 6.8 ppm to 8.0 ppm in $^1$H-NMR spectrum of P-7. The imide ratio and the amic acid ester ratio were determined, and then the remaining value was determined as an amic acid ratio to analyze the composition of P-7.

As a result of analyzing the composition of P-7 by the method, a ratio of the amic acid structure was 20%, a ratio of the amic acid ester structure was 14%, and a ratio of the imide structure was 65%.

Example 8: Preparation of P-8 Polymer for Liquid Crystal Alignment

Polymer P-8 was prepared in the same manner as in Example 7, except that 4.0 g of DA-6, 1.59 g of PDA, 108.4 g of NMP, 6.46 g of DMCBDA, 3.5 g of acetic anhydride, and 2.7 g of pyridine were used in Example 7. A molecular weight of P-8 was examined by GPC, and as a result, its number average molecular weight (Mn) was 18,000 g/mol and its weight average molecular weight (Mw) was 33,000 g/mol. A composition of P-8 was analyzed by the analysis method of Example 7, and as a result, a ratio of the imide structure was 55.0%, and a ratio of the amic acid structure was 45.0%.

Comparative Example 1: Preparation of B-1 Polymer for Liquid Crystal Alignment Polymer B-1 was prepared in the same manner as in Example 1, except that 1.0 g of DA-2 and 5.46 g of phenylenediamine (PDA) were first dissolved in 163.21 g of NMP, and then 11.68 g of 1,3-dimethyl-cyclobutane-1,2,3,4-tetracarboxylic acid dianhydride (DMCBDA) was added thereto in Example 1. A molecular weight of B-1 was examined by GPC, and as a result, its number average molecular weight (Mn) was 14,000 g/mol and its weight average molecular weight (Mw) was 26,000 g/mol. The monomer structure of B-1 was analyzed, and as a result, a ratio of the imide structure in the molecule was 4.9%, and a ratio of the amic acid structure in the molecule was 95.1%.

Comparative Example 2: Preparation of B-2 Polymer for Liquid Crystal Alignment Polymer B-2 was prepared in the same manner as in Example 1, except that 6.00 g PDA was first dissolved in 156.9 g of NMP, and then 5.34 g of CBDA and 6.10 g of DMCBDA were added thereto in Example 1. A molecular weight of B-2 was examined by GPC, and as a result, its number average molecular weight (Mn) was 15,000 g/mol and its weight average molecular weight (Mw) was 28,000 g/mol. The monomer structure of B-2 was analyzed, and as a result, a ratio of the amic acid structure in the molecule was 100%.

Comparative Example 3: Preparation of B-3 Polymer for Liquid Crystal Alignment Polymer B-3 was prepared in the same manner as in Example 7, except that 6.00 g of PDA, 163.8 g of NMP, 12.20 g of DMCBDA, 6.7 g of acetic anhydride, and 5.2 g of pyridine were used in Example 7.

However, during chemical imidization, gelation of the reaction solution occurred. The reactant which had undergone gelation was stirred in an excess amount of distilled water to obtain a solid. The obtained solid was washed with an excess amount of distilled water twice and washed with methanol three times, and then dried in an oven at 40° C. under reduced pressure for 24 hours to prepare the polymer B-3. However, the prepared B-3 had poor solubility and therefore, its molecular weight could not be measured. A composition thereof was analyzed by the analysis method of Example 7, and as a result, a ratio of the imide structure was 75.0% and a ratio of the amic acid structure was 25.0%.

Comparative Example 4: Preparation of B-4 Polymer for Liquid Crystal Alignment Polymer B-4 was prepared in the same manner as in Example 1, except that 7.0 g of DA-3 was first dissolved in 97.75 g of NMP, and then 3.86 g of DMCBDA was added thereto in Example 1. A molecular weight of B-4 was examined by GPC, and as a result, its number average molecular weight (Mn) was 15,000 g/mol and its weight average molecular weight (Mw) was 29,000 g/mol. The monomer structure of B-4 was analyzed, and as a result, a ratio of the imide structure in the molecule was 50.5%, and a ratio of the amic acid structure in the molecule was 49.5%.

Experimental Example: Evaluation of Properties of Liquid Crystal Alignment Layer <Preparation of Liquid Crystal Aligning Agent and Liquid Crystal Cell>

(1) Preparation of Liquid Crystal Aligning Agent

Each of the polymers prepared according to Examples 1 to 8 and Comparative Examples 1 to 5 was dissolved at a ratio of 5% by weight of a solid component in a mixed solution of NMP and n-butoxy ethanol at a weight ratio of 8:2. Each resulting solution was filtered under reduced pressure through a filter made of poly(tetrafluorene ethylene) with a pore size of 0.2 μm to prepare a liquid crystal aligning agent.

(2) Preparation of Liquid Crystal Cell

Each of the liquid crystal aligning agents prepared as above was used to fabricate a liquid crystal cell by the following method.

The liquid crystal aligning agent was applied onto a substrate (lower substrate) which was manufactured by forming comb-shaped IPS (in-plane switching) mode ITO electrode patterns with a thickness of 60 nm, an electrode width of 3 μm, and a gap between electrodes of 6 μm on a square glass substrate with a size of 2.5 cm×2.7 cm and a glass substrate (upper substrate) which had no electrode patterns by a spin coating method, respectively.

(2-1) Alignment Treatment Process of the Present Invention-A

Subsequently, each of the substrates onto which the liquid crystal aligning agent was applied was dried on a hot plate at about 70° C. for 3 minutes to evaporate the solvent. To align the coating film thus obtained, UV ray at 254 nm was irradiated onto each of the coating films of the upper/lower substrates using an exposure equipped with a linear polarizer at a dose of 0.5 J/cm$^2$ or 1 J/cm$^2$.

Thereafter, the aligned upper/lower substrates were sintered (cured) in an oven at about 230° C. for 30 minutes to obtain a coating film having a thickness of 0.1 μm. A sealing agent impregnated with a ball spacer with a size of 3 μm was applied to the edges of the upper substrate, excluding a liquid crystal inlet. The alignment films formed on the upper and lower substrates were arranged to face each other so that the alignment directions are oriented parallel to each other. Then, the upper and lower substrates were adhered to each other, and the sealing agent was cured to form an empty cell. Liquid crystals were injected into the empty cell to fabricate an IPS mode liquid crystal cell.

(2-2) Known Alignment Treatment Process Comparative to that of the Present Invention-B Each of the substrates onto which the liquid crystal aligning agent was applied by spin coating was dried on a hot plate at about 70° C. for 3 minutes to evaporate the solvent. Thereafter, the substrates were sintered (cured) in an oven at about 230° C. for 30 minutes to obtain a coating film having a thickness of 0.1 μm.

To align the coating film thus obtained, UV ray at 254 nm was irradiated onto each of the coating films of the upper/lower substrates using an exposure equipped with a linear polarizer at a dose of 1 J/cm$^2$. A sealing agent impregnated with a ball spacer with a size of 3 μm was applied to the edges of the upper substrate, excluding a liquid crystal inlet. The alignment films formed on the upper and lower substrates were arranged to face each other so that the alignment directions are oriented parallel to each other. Then, the upper and lower substrates were adhered to each other, and the sealing agent was cured to form an empty cell. Liquid crystals were injected into the empty cell to fabricate an IPS mode liquid crystal cell.

<Evaluation of Properties of Liquid Crystal Alignment Layer>

(1) Evaluation of Liquid Crystal Alignment Property

Polarizers were attached to the upper and lower substrates of the liquid crystal cell fabricated by the alignment treatment process of A or B so that they were perpendicular to each other. The polarizer-attached liquid crystal cell was placed on a backlight of brightness of 7,000 cd/m², and light leakage was observed with the naked eye. As a result, when the liquid crystal alignment layer has excellent alignment property to align liquid crystals properly, light did not pass through the upper and lower polarizers which were attached perpendicular to each other, and the liquid crystal cell was observed dark without defectives. In this case, the alignment property was recorded as 'good'. When light leakage such as liquid crystal flow mark or bright spot was observed, it was recorded as 'poor' in Table 1.

(2) Evaluation of Light Exposure of Liquid Crystal Cell

When the liquid crystal cells were fabricated by the above method, a dose of light exposure was changed to 0.5 J/cm² or 1 J/cm² in order to obtain excellent liquid crystal cells. As the required dose of light exposure is smaller, light sensitivity is more excellent. The dose of light exposure of the liquid crystal cell was evaluated based on the dose of light exposure required to obtain liquid crystal alignment, shown in the following Table 1.

(3) Evaluation of Liquid Crystal Alignment Stability

The polarizer-attached liquid crystal cell which was fabricated to evaluate the liquid crystal alignment property (1) was used to evaluate the liquid crystal alignment stability.

In detail, the polarizer-attached liquid crystal cell was attached on a backlight of 7,000 cd/m² and luminance at the black state was measured using a luminance meter PR-880. The liquid crystal cell was operated at room temperature and an alternating voltage of 5 V for 24 hours. Thereafter, at the voltage-off state of the liquid crystal cell, luminance at the black state was measured as described above.

A difference between the initial luminance (L0) measured before operation of the liquid crystal cell and the later luminance (L1) measured after operation was divided by the initial luminance (L0), and then multiplied by 100 to calculate a luminance change. As the calculated luminance change is close to 0%, the alignment stability is considered as 'excellent'. The luminance change of less than 10% was recorded as 'excellent', the luminance change of 10% or more and less than 20% was recorded as 'fair', and the luminance change of 20% or more was recorded as 'poor' in Table 1.

TABLE 1

| | Alignment treatment process | Dose of light exposure (J/cm²) | Liquid crystal alignment property | Alignment stability |
|---|---|---|---|---|
| Example 1 | A | 0.5 | Good | Excellent |
| Example 2 | A | 0.5 | Good | Excellent |
| Example 3 | A | 0.5 | Good | Excellent |
| Example 4 | A | 0.5 | Good | Excellent |
| Example 5 | A | 0.5 | Good | Excellent |
| Example 6 | A | 0.5 | Good | Excellent |
| Example 7 | A | 0.5 | Good | Excellent |
| Example 8 | A | 0.5 | Good | Excellent |
| Comparative Example 1 | A | 1 | Poor | Poor |
| Comparative Example 2 | B | 1 | Good | Fair |
| Comparative Example 3 | Not applicable | | | |
| Comparative Example 4 | A | 1 | Poor | Poor |

What is claimed is:

1. A method of manufacturing a liquid crystal alignment layer, the method comprising the steps of:

forming a coating film by applying a liquid crystal aligning agent onto a substrate, the liquid crystal aligning agent including a polymer for liquid crystal alignment including two or more repeating units selected from the group consisting of a repeating unit represented by the following Chemical Formula 1, a repeating unit represented by the following Chemical Formula 2, and a repeating unit represented by the following Chemical Formula 3, wherein the repeating unit represented by the following Chemical Formula 1 is included in an amount of 5 mol % to 74 mol % with respect to a total of the repeating units represented by the following Chemical Formulae 1 to 3;

drying the coating film;

performing alignment treatment of the coating film by light irradiation immediately after the drying step; and curing the alignment-treated coating film by heat treatment:

[Chemical Formula 1]

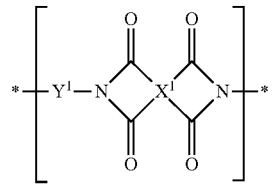

[Chemical Formula 2]

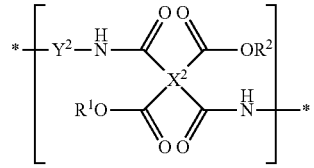

[Chemical Formula 3]

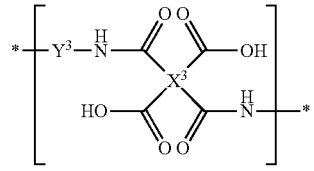

wherein $R^1$ and $R^2$ are each independently hydrogen or an alkyl group having 1 to 10 carbon atoms, provided that $R^1$ and $R^2$ are not all hydrogen, $X^1$ is a tetravalent organic group represented by the following Chemical Formula 4,

[Chemical Formula 4]

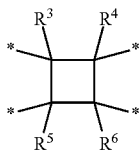

R³ to R⁶ are each independently hydrogen or an alkyl group having 1 to 6 carbon atoms, X² and X³ are each independently a tetravalent organic group derived from hydrocarbon having 4 to 20 carbon atoms, or a tetravalent organic group, in which one or more hydrogens are substituted with halogen, or one or more —CH₂— groups are substituted with —O—, —CO—, —S—, —SO—, —SO₂— or —CONH— to prevent direct linkage of oxygen or sulfur atoms, Y¹ to Y³ are each independently a divalent organic group represented by the following Chemical Formula 5,

[Chemical Formula 5]

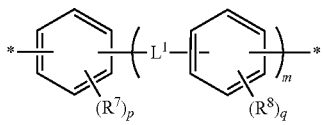

wherein R⁷ and R⁸ are each independently halogen, a cyano group, an alkyl group having 1 to 10 carbon atoms, an alkenyl group having 2 to 10 carbon atoms, an alkoxy group having 1 to 10 carbon atoms, a fluoroalkyl group having 1 to 10 carbon atoms, or a fluoroalkoxy group having 1 to 10 carbon atoms, p and q are each independently an integer of 0 to 4, L¹ is a single bond, —O—, —CO—, —S—, —SO₂—, —C(CH₃)₂—, —C(CF₃)₂—, —CONH—, —COO—, —(CH₂)$_z$—, —O(CH₂)$_z$O—, —O(CH₂)$_z$—, —OCH₂—C(CH₃)₂—CH₂O—, —COO—(CH₂)$_z$—OCO— or —OCO—(CH₂)$_z$—COO—, z is an integer of 1 to 10, and m is an integer of 0 to 3.

2. The method of manufacturing the liquid crystal alignment layer of claim 1, wherein X² and X³ are each independently a tetravalent organic group represented by the following Chemical Formula 6:

[Chemical Formula 6]

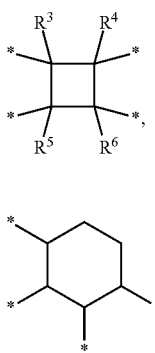

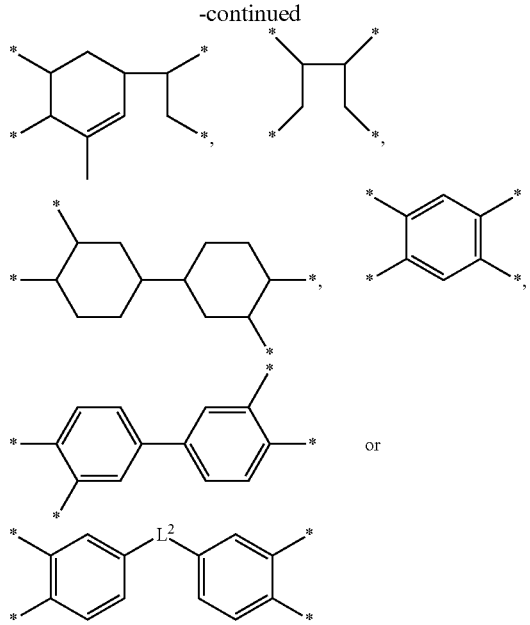

wherein R³ to R⁶ are each independently hydrogen or an alkyl group having 1 to 6 carbon atoms, L² is any one selected from the group consisting of a single bond, —O—, —CO—, —S—, —SO—, —SO₂—, —CR⁹R¹⁰—, —CONH—, phenylene or combinations thereof, and R⁹ and R¹⁰ are each independently hydrogen, or an alkyl or fluoroalkyl group having 1 to 10 carbon atoms.

3. The method of manufacturing the liquid crystal alignment layer of claim 1, wherein the liquid crystal aligning agent is prepared by dissolving or dispersing the polymer for liquid crystal alignment in an organic solvent.

4. The method of manufacturing the liquid crystal alignment layer of claim 1, wherein the step of drying the coating film is performed at 50° C. to 150° C.

5. The method of manufacturing the liquid crystal alignment layer of claim 1, wherein the light irradiation in the alignment treatment step is performed by irradiating polarized ultraviolet rays having a wavelength of 150 nm to 450 nm.

6. The method of manufacturing the liquid crystal alignment layer of claim 1, wherein a heat treatment temperature in the step of curing the coating film is 150° C. to 300° C.

7. A method of manufacturing a liquid crystal alignment layer, the method comprising the steps of:
forming a coating film by applying a liquid crystal aligning agent onto a substrate, the liquid crystal aligning agent including a polymer for liquid crystal alignment including two or more repeating units selected from the group consisting of a repeating unit represented by the following Chemical Formula 1, a repeating unit represented by the following Chemical Formula 2, and a repeating unit represented by the following Chemical Formula 3, wherein the repeating unit represented by the following Chemical Formula 1 is included in an amount of 5 mol % to 74 mol % with respect to a total of the repeating units represented by the following Chemical Formulae 1 to 3;
drying the coating film;
performing alignment treatment of the coating film by light irradiation immediately after the drying step; and curing the alignment-treated coating film by heat treatment:

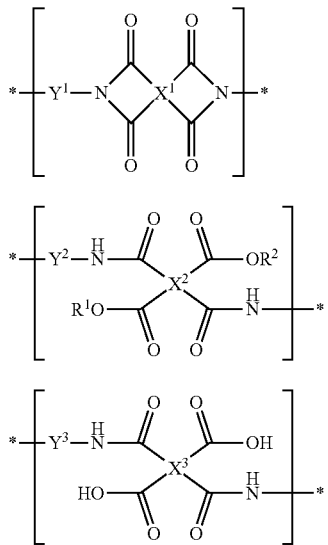

[Chemical Formula 1]

[Chemical Formula 2]

[Chemical Formula 3]

wherein $R^1$ and $R^2$ are each independently hydrogen or an alkyl group having 1 to 10 carbon atoms, provided that $R^1$ and $R^2$ are not all hydrogen, $X^1$ is a tetravalent organic group, $X^2$ and $X^3$ are each independently a tetravalent organic group derived from hydrocarbon having 4 to 20 carbon atoms, or a tetravalent organic group, in which one or more hydrogens are substituted with halogen, or one or more —$CH_2$— groups are substituted with —O—, —CO—, —S—, —SO—, —$SO_2$— or —CONH— to prevent direct linkage of oxygen or sulfur atoms, $Y^1$ to $Y^3$ are each independently a divalent organic group represented by the following Chemical Formula 5,

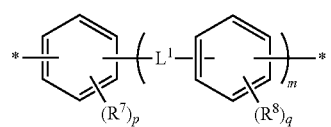

[Chemical Formula 5]

wherein $R^7$ and $R^8$ are each independently halogen, a cyano group, an alkyl group having 1 to 10 carbon atoms, an alkenyl group having 2 to 10 carbon atoms, an alkoxy group having 1 to 10 carbon atoms, a fluoroalkyl group having 1 to 10 carbon atoms, or a fluoroalkoxy group having 1 to 10 carbon atoms, p and q are each independently an integer of 0 to 4, $L^1$ is a single bond, —O—, —CO—, —S—, —$SO_2$—, —$C(CH_3)_2$—, —$C(CF_3)_2$—, —CONH—, —COO—, —$(CH_2)_z$—, —$O(CH_2)_zO$—, —$O(CH_2)_z$—, —$OCH_2$—$C(CH_3)_2$—$CH_2O$—, —COO—$(CH_2)_z$—OCO— or —OCO—$(CH_2)_z$—COO—, z is an integer of 1 to 10, and m is an integer of 0 to 3.

\* \* \* \* \*